United States Patent
Xiao et al.

(10) Patent No.: US 12,483,759 B2
(45) Date of Patent: Nov. 25, 2025

(54) OBJECT DISPLAY METHOD AND APPARATUS, ELECTRONIC DEVICE, AND STORAGE MEDIUM

(71) Applicant: BEIJING BYTEDANCE NETWORK TECHNOLOGY CO., LTD., Beijing (CN)

(72) Inventors: Wenbin Xiao, Beijing (CN); Ying Li, Beijing (CN); Jingjin Yuan, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/468,062

(22) Filed: Sep. 15, 2023

(65) Prior Publication Data

US 2024/0080532 A1 Mar. 7, 2024

Related U.S. Application Data

(63) Continuation of application No. PCT/CN2022/080817, filed on Mar. 15, 2022.

(30) Foreign Application Priority Data

Mar. 15, 2021 (CN) .......................... 202110277544.2

(51) Int. Cl.
*H04N 21/478* (2011.01)
*H04N 21/2187* (2011.01)

(52) U.S. Cl.
CPC ....... *H04N 21/478* (2013.01); *H04N 21/2187* (2013.01)

(58) Field of Classification Search
None
See application file for complete search history.

(56) References Cited

U.S. PATENT DOCUMENTS 9,973,819 B1 * 5/2018 Taylor ................ G06Q 30/0643
2004/0128317 A1 7/2004 Sull et al.
(Continued)

FOREIGN PATENT DOCUMENTS

| CN | 105828123 A | 8/2016 |
| CN | 108090107 A | 5/2018 |

(Continued)

OTHER PUBLICATIONS

International Search Report (with English translation) and Written Opinion issued in PCT/CN2022/080817, dated Jun. 7, 2022, 10 pages provided.

*Primary Examiner* — Alexander Q Huerta
(74) *Attorney, Agent, or Firm* — Astute IP Law Group

(57) ABSTRACT

An object display method and apparatus, an electronic device, and a storage medium are provided. The method includes: receiving a trigger operation on a target control displayed on a livestreaming video interface; and displaying an object display interface in response to the trigger operation, where the object display interface includes: a first display list and a second display list, the first display list includes at least one object, the second display list includes some or all of the objects in the first display list, objects in the second display list are arranged according to correlation information corresponding to a client, and one of the first display list and the second display list is in a display state.

15 Claims, 9 Drawing Sheets

(56) References Cited

U.S. PATENT DOCUMENTS

| | | | |
|---|---|---|---|
| 2009/0307092 A1* | 12/2009 | Gugliuzza | G06Q 30/0601 |
| | | | 715/716 |
| 2013/0117262 A1* | 5/2013 | Lenahan | H04N 21/4758 |
| | | | 707/736 |
| 2013/0163962 A1* | 6/2013 | Young | H04N 5/783 |
| | | | 386/E5.028 |
| 2015/0135212 A1* | 5/2015 | Smolic | H04N 21/4882 |
| | | | 725/32 |
| 2018/0152764 A1* | 5/2018 | Taylor | G06Q 30/0623 |
| 2019/0155864 A1 | 5/2019 | Peng et al. | |
| 2022/0277379 A1* | 9/2022 | Kyung | G06F 3/04855 |

FOREIGN PATENT DOCUMENTS

| | | |
|---|---|---|
| CN | 109104639 A | 12/2018 |
| CN | 110996110 A | 4/2020 |
| CN | 111612560 A | 9/2020 |
| CN | 111612588 A | 9/2020 |
| CN | 111753158 A | 10/2020 |
| CN | 111935489 A | 11/2020 |
| CN | 112004106 A | 11/2020 |
| CN | 112130938 A | 12/2020 |
| CN | 112150156 A | 12/2020 |
| CN | 306236664 S | 12/2020 |
| CN | 112399200 A | 2/2021 |
| CN | 113643105 A | 11/2021 |
| WO | WO2017166517 A1 | 10/2017 |

\* cited by examiner

OBJECT DISPLAY METHOD AND APPARATUS, ELECTRONIC DEVICE, AND STORAGE MEDIUM

The present disclosure is a continuation of International Application No. PCT/CN2022/080817, filed on Mar. 15, 2022, which claims the priority to Chinese Patent Application No. 202110277544.2, titled "OBJECT DISPLAY METHOD AND APPARATUS, ELECTRONIC DEVICE, AND STORAGE MEDIUM", filed on Mar. 15, 2021, with the China National Intellectual Property Administration, both of which are incorporated herein by reference in their entireties.

FIELD

The present disclosure relates to the technical field of live streaming, and in particular to an object display method and apparatus, an electronic device and a storage medium.

BACKGROUND

Video live through the live streaming platform has features of real-time performance and interactive performance. Thus, the video live has been widely loved by users, and an Application (APP) with live streaming function has also been widely used.

SUMMARY

An object display method and apparatus, an electronic device and a storage medium are provided according to an embodiment of the present disclosure.

In first aspect, an object display method applied to a client is provided according to an embodiment of the present disclosure. The method includes:
  receiving a trigger operation on a target control displayed on a live streaming interface;
  displaying an object display interface in response to the trigger operation, where the object display interface includes a first display list and a second display list, the first display list includes at least one object, the second display list includes at least part of object in the first display list; the object in the second display list is arranged based on correlation information between the object in the second display list and the client, and at least one of the first display list and the second display list is in a display state.

In an embodiment, the method further includes:
  in a case that the first display list is in the display state, displaying the second display list and hiding the first display list in response to a received first switching operation; or
  in a case that the second display list is in the display state, displaying the first display list and hiding the second display list in response to a received second switching operation.

In an embodiment, a first label and a second label are displayed on the object display interface, where the first label corresponds to the first display list and the second label corresponds to the second display list;
  the first switching operation includes: clicking the second label; or a sliding operation in a direction from the first label to the second label; and
  the second switching operation includes: clicking the first label; or a sliding operation in a direction from the second label to the first label.

In an embodiment, text description information corresponding to the second label is displayed on the object display interface, and the text description information is used to illustrate that the object in the second display list corresponding to the second label is arranged based on the correlation information between the object in the second display list and the client.

In an embodiment, the text description information corresponding to the second label is displayed in a bubble box, and the bubble box is displayed adjacent to the second label.

In an embodiment, the bubble box is hidden after being displayed for a preset time.

In an embodiment, the object in the first display list include: an object related to the live streaming;
  the second display list further includes an object unrelated to the live streaming.

In an embodiment, the object display interface is displayed on the live streaming interface in a half-screen in an overlapping manner.

In second aspect, an object display apparatus applied to a client is provided according to an embodiment of the present disclosure. The apparatus includes:
  a receiving unit configured to receive a trigger operation on a target control displayed on a live streaming interface; and
  a display unit configured to display an object display interface in response to the trigger operation, where the object display interface includes a first display list and a second display list, the first display list includes at least one object, the second display list includes at least part of object in the first display list; the object in the second display list is arranged based on correlation information between the object in the second display list and the client, and one of the first display list and the second display list is in a display state.

In an embodiment, the display unit is further configured to: in a case that the first display list is in the display state, display the second display list and hide the first display list in response to a received first switching operation; or
  the display unit is further configured to: in a case that the second display list is in the display state, display the first display list and hide the second display list in response to a received second switching operation.

In an embodiment, the object display interface further displays a first label and a second label, where the first label corresponds to the first display list and the second label corresponds to the second display list;
  the first switching operation includes: clicking the second label; or an sliding operation from the first label to the second label; and
  the second switching operation includes: clicking the first label; or an sliding operation from the second label to the first label.

In an embodiment, text description information corresponding to the second label is displayed on the object display interface, and the text description information is used to illustrate that the object in the second display list corresponding to the second label is arranged based on the correlation information between the object in the second display list and the client.

In an embodiment, the text description information corresponding to the second label is displayed in a bubble box, and the bubble box is displayed adjacent to the second label.

In an embodiment, the bubble box is hidden after being displayed for a preset time.

In an embodiment, the object in the first display list include: an object related to the live streaming; and the second display list further includes an object unrelated to the live streaming.

In an embodiment, the object display interface is displayed on the live streaming interface in a half-screen in an overlapping manner.

In third aspect, an electronic device is provided according to an embodiment of the present disclosure. The electronic device includes: a processor configured to execute a computer program stored in a memory, where the computer program, when executed by the processor, implements any one of object display methods provided according to the first aspect.

In fourth aspect, a computer readable storage medium is provided according to an embodiment of the present disclosure. The computer readable storage medium stores a computer program, where the computer program, when executed by a processor, implements any one of object display methods provided according to the first aspect.

In fifth aspect, a computer program product is provided according to an embodiment of the present disclosure. The computer program product, when running on a computer, causes the computer to perform any one of object display methods provided according to the first aspect.

BRIEF DESCRIPTION OF THE DRAWINGS

The drawings herein are incorporated into the specification and constitute a part of the specification, which show embodiments of the present disclosure. The drawings and the specification are used to explain the principle of the present disclosure.

In order to more clearly explain the embodiments of the present disclosure or the technical solutions in the conventional art, the drawings used in the description of the embodiments or the conventional art are briefly introduced below. Apparently, for those skilled in the art, other drawings may be obtained according to the provided drawings without any creative effort.

DETAILED DESCRIPTION OF EMBODIMENTS

Figure 1:
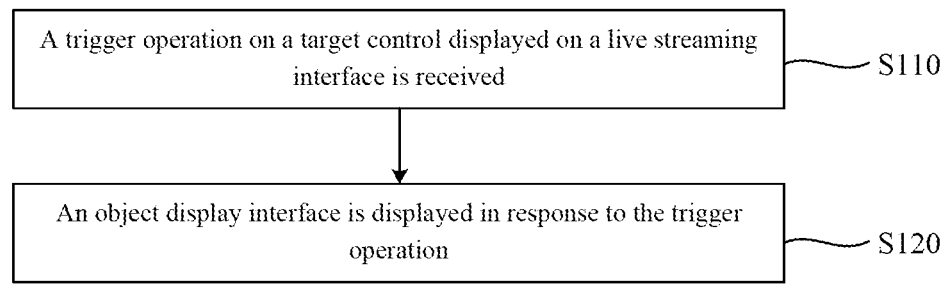
FIG. 1 is a flow chart of an object display method according to an embodiment of the present disclosure.

In order to make the above purposes, features, and advantage of the present disclosure more apparent and easy to understand, the technical solutions in the embodiments of the present disclosure are further described hereinafter. It should be noted that the embodiments of the present disclosure and the features in the embodiments may be combined with each other in the case of no conflict.

Although many specific details are set forth in the following description to facilitate a full understanding of the present disclosure, the present disclosure may be implemented in other ways than those described herein. Apparently, the embodiments in the specification are only some of, rather than all, embodiments of the present disclosure.

An application scenario involved in the present disclosure is in which live streaming is performed on a live streaming platform to introduce an object. The object may be daily necessities, food, ornaments, clothing or services. In one live streaming process, more than one object is introduced usually. In the conventional technology, an entrance button is displayed on the live streaming interface, and the user may enter the object display interface by clicking the entrance button while watching the live streaming. At least one object is displayed as a list on the object display interface, and the object in the list is arranged in an added order. When the user expects to discover a target object, the user may only browse the list in the added order to search. However, according to the conventional technology, the target object by the user is searched out inefficiently.

The technical solution according to the present disclosure may be applied to an electronic device. The electronic device may be a computer, a tablet, a mobile phone or other intelligent clients. The electronic device has a display screen, which may be a touch screen or a non-touch screen. For the electronic device with the touch screen, an interactive operation with the electronic device may be realized through a gesture, a finger or a touch tool, such as, a stylus. For the electronic device with non-touch screen, interactive operation with the electronic device may be realized through an external device, such as, a mouse or a keyboard.

The technical solution according to the present disclosure is applied to a live scenario. The way for entering the live scenario by the user may include, but be not limited to, the following possible ways. In one implementation, the live scenario is entered through an APP with a live function installed on an electronic device. The APP may only have live function. Alternatively, besides the live function, the APP may have other functions, such as short video sharing function, which is not limited in the present disclosure. In another implementation, the live scenario is entered through an applet, scanning QR code or identifying QR code. In yet another implementation, the live scenario is entered through a webpage. The present disclosure does not limit the specific way of entering the live scenario.

The objects in the present disclosure may be daily necessities, food, ornaments, clothing or services. According to the present disclosure, in order to improve the efficiency of obtaining the target object by the user, correlation information between the object and the client is determined after the user enters the live scenario. Based on the correlation information between the object and the client, a second display list is displayed to the user in the object display interface. The objects in the second display list are displayed based on the correlation information between the object and the client, such that the efficiency of obtaining the target object by the user can be improved, thereby improving the user experience.

For the convenience of description, in the present disclosure, the list arranged based on the correlation information between the object and client is described as a second display list, and a list displayed according to other rules (for example, added order) is described as a first display list.

It should be noted that an interface name or a control name involved in the present disclosure serve as an example, and may also be replaced by other names that achieve the same function, which is not limited in the present disclosure.

The technical solution according to the present disclosure is described according to several embodiments.

FIG. 1 is a flow chart of an object display method according to an embodiment of the present disclosure. As shown in FIG. 1, the method includes S110 and S120.

In S110, a trigger operation on a target control displayed on a live streaming interface is received.

The live streaming interface refers to an interface for playing live streaming. The user may obtain the information related to the object through live streaming.

Figure 2:
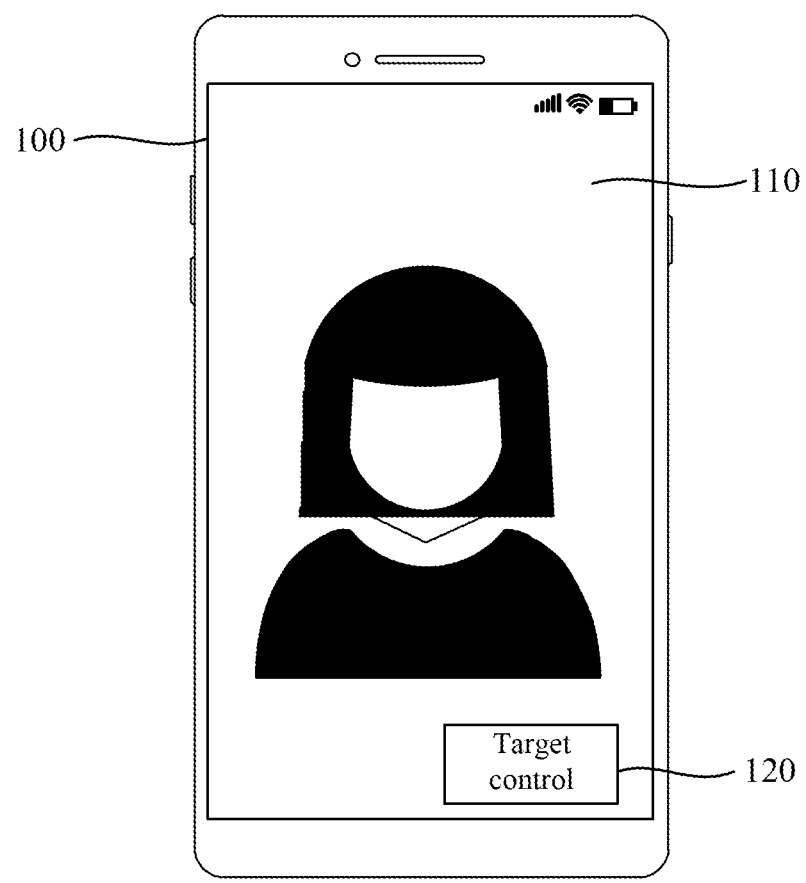
FIG. 2 is a schematic view of a live streaming interface according to an embodiment of the present disclosure.

A target control is displayed on the live streaming interface. The target control in the present disclosure refers to a control that may enter an object display interface. Other controls may also be displayed on the live streaming interface. For example, a control for interacting with the host is displayed. The target control may be displayed on an edge area of the live streaming interface to avoid blocking the live streaming. For example, the target control is displayed on the lower edge, the upper edge, the left edge or the right edge of the live streaming interface. FIG. 2 is a schematic view of an live streaming interface according to an embodiment of the present disclosure. As shown in FIG. 2, the target control being displayed on the lower edge is taken as an example. A live streaming screen 110 and a target control 120 are displayed the live streaming interface 100.

When the user wants to enter the object display interface, the user may trigger the target control 120 by clicking, sliding or speech.

In S120, an object display interface is displayed in response to the trigger operation.

The object display interface includes a first display list and a second display list. The first display list includes at least one object. The second display list includes at least part of objects in the first display list. The object in the second display list is arranged based on correlation information between the object in the second display list and the client. That is, for users corresponding to different clients, the sorting of objects in the second display list displayed on the object display interface is differentiated.

In an embodiment, the first display list and the second display list may be both displayed on the object display interface. Alternatively, only one display list may be displayed at a time instant, and the display list displayed on the object display interface may be controlled by a switching operation. For example, when the first display list is in a display state, the user inputs the switching operation, and then the second display list is in the display state. When the second display list is in the display state, the user inputs the switching operation, and then the first display list is in the display state.

For each object, the correlation information between the object and the client may include a recommendation index of the object corresponding to the client, that is, an index for recommending this object to the client. It should be noted that the correlation information may be not limited to the recommendation index of the object corresponding to the client.

The object in the second display list is displayed based on the correlation information between the object in the second display list and the client. For example, the larger the recommendation index of the object corresponding to the client, the higher the display position of the object in the second display list, and the easier the object is to be found by the user. For example, two objects, i.e., object a and object b, are displayed in the second display list on the object display interface of a first client. The recommendation index of the object a corresponding to the first client is larger than that of the object b corresponding to the first client. In this case, in the second display list displayed on the first client, the display position of the object a is higher than that of the object b. When the two objects, i.e., object a and object b, are displayed in the second display list on the object display interface of a second client. The recommendation index of the object a corresponding to the second client is smaller than that of the object b corresponding to the second client. In this case, in the second display list displayed on the second client, the display position of the object a is lower than that of the object b. Thus, searching efficiency of the user is improved, thereby improving the user experience.

In this embodiment, after the trigger operation on the target control displayed on the live streaming interface is received, an object display interface is displayed in response to the trigger operation. The object display interface includes a first display list and a second display list. The first display list includes at least one object. The second display list includes at least part of object in the first display list. The object in the second display list is arranged based on correlation information between the object in the second display list and the client. Since the object in the second display list is arranged based on the correlation information between the object and the client, the efficiency of obtaining the target object by the user is improved, thereby improving the user experience.

In an embodiment, in the above embodiment, one of the first display list and the second display list is in a display state. Only one display list is displayed on the object display interface at a time instant, such that the object display interface is concise and clear, thereby improving the user experience.

Alternatively, in an embodiment, the first display list and the second display list are both displayed on the object display interface, which is convenient for the user to select any one list to search according to user's needs, thereby improving the convenience of the user performing operations.

The ways for displaying the first display list and the second display list on the object display interface may include, but be not limited to, the following possible ways.

In one implementation, the first display list and the second display list are both displayed on the object display interface.

Figure 3:
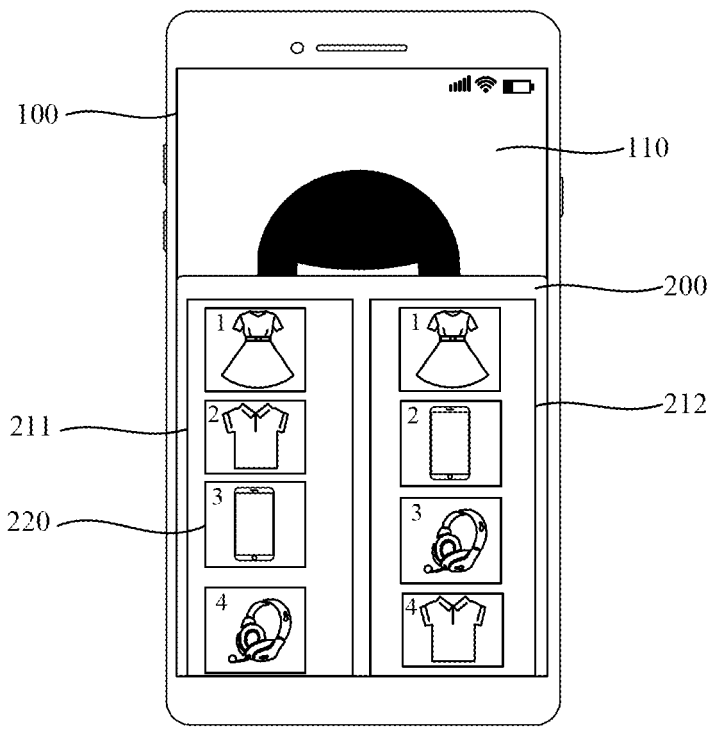
FIG. 3 is a schematic view of an object display interface according to an embodiment of the present disclosure.

Exemplarily, as shown in FIG. 3, a first display list 211 and a second display list 212 are both displayed on the object display interface 200. The first display list 211 includes multiple objects 220. The second display list 212 includes some or all of objects in the first display list 211. The objects in the second display list 212 displayed on the object display interface 200 are displayed based on the correlation information between the objects and the client. The objects in the second display list 212 may be arranged in descending order by the correlation information between the object and the client, so as to improve the efficiency of the user searching for the target object.

The objects in the second display list may be all objects in the first display list. All objects in the first display list are displayed in the second display list based on the correlation information between the object and the client. For example, the objects are displayed in the second display list in descending order based on the correlation information between the object and the client. The objects in the second display list may be some of the objects in the first display list. For example, N objects in the first display list that have the highest correlation degree of the correlation information are displayed in the second display list. For example, N objects are displayed in the second display list in descending order based on the correlation information between the object and the client, where N is greater than or equal to 1 or less than the total number of objects in the first display list. In an embodiment, the value of N may be fixed. For example, the objects with the top 10 recommendation index are displayed in the second display list for any user. By displaying the N objects with the highest correlation degrees to the user, the targeted second display list is provided and the processing resources consumed by displaying unnecessary objects are reduced. The value of N may be not fixed. For example, only the objects having the correlation degree greater than a preset threshold are displayed in the second display list. Thus, the user may indirectly determine the correlation degree of the live streaming to the user based on the number of objects displayed in the second list. The objects in the second display list may further include other objects that are not related to the live streaming. For example, objects are displayed in the APP through other channels, but some of the objects are not related to the live streaming. The other objects and some or all of the objects in the first display list may be sorted based on the correlation information between the object and the client, and some or all of the sorted objects are displayed in the second display list in descending order by the correlation information between the object and the client.

In an embodiment, the other objects may be objects related to other live streaming. Other objects and some or all of the objects in the first display list may be sorted based on the correlation information between the object and the client, and the sorted other objects are displayed in a preset position of the second display list. That is, the user may know that the other objects are not involved in the current live streaming through the preset position. Alternatively, other objects and some or all of the objects in the first display list may be sorted based on the correlation information between the object and the client, and the sorted other objects are displayed in the second display list. Identification is added to the other objects to mark that the other objects are not involved in the current streaming. The user may enter other live streaming related to other objects by triggering other objects. Other live streaming may be displayed on the object display interface in a floating manner, which is easy to return to the second display list. It is also possible to exit the object display interface when other live broadcast videos are playing, which is not limited in the present disclosure. According to the present disclosure, other objects are displayed in the second display list, such that the selection range of the target object that the user can obtain is expanded, and the probability that the user obtains the target object is improved, thereby improving the user experience.

Due to the limited screen size of the electronic device, objects in the display list displayed on the screen may be adjusted by sliding up or sliding down. For example, objects arranged behind the currently displayed object may be displayed by a sliding-up operation, and objects arranged in front of the currently displayed object may be display by a sliding-down operation.

In this implementation, the second display list may be displayed on the object display interface. The objects in the second display list are arranged based on the correlation information between the objects in the second display list and the client, such that the user can search for objects related to the user more easily, which is helpful to improve the efficiency of searching for the target object by the user, thereby improving the user experience. In addition, by displaying both of the first display list and the second display list on the object display interface, it is convenient for the user to select any one list to search according to the user's needs, thereby improving the convenience of the user performing operations.

In another possible implementation, one of the first display list and the second display list is in a display state. That is, only one display list is displayed on the object display interface at a time instant. The display list displayed on the object display interface may be switched through the switching operation inputted by the user.

Specifically, in the case that a first display list is in the display state, a first switching operation inputted by a user is received, and a second display list is displayed and the first display list is hidden in response to the first switching operation.

Figure 4:
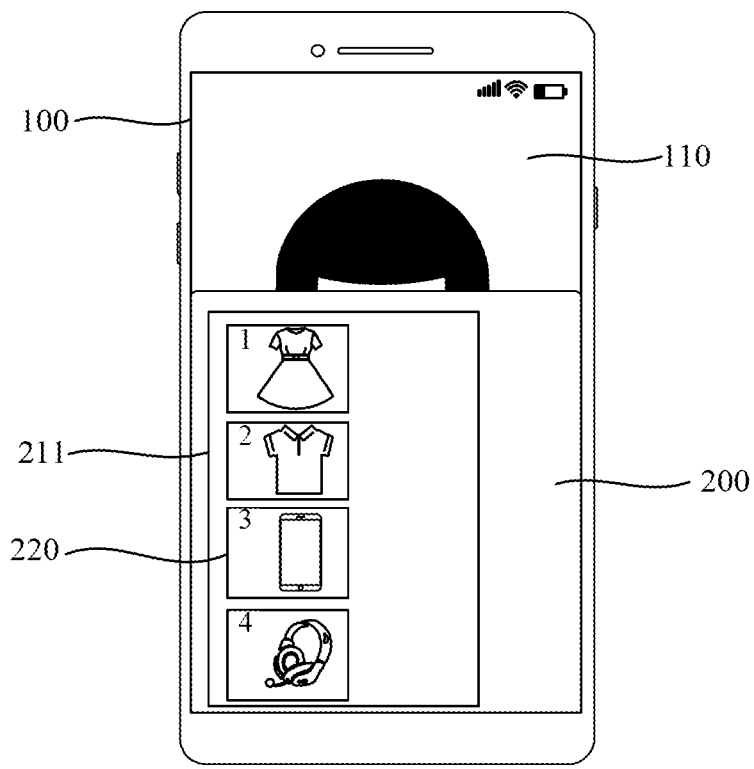
FIG. 4 is a schematic view of another object display interface according to an embodiment of the present disclosure.

As shown in FIG. 4, the first display list 211 in the object display interface 200 is in the display state. When the user wants to view the second display list, the user inputs a first switching operation. The electronic device receives the first switching operation inputted by the user, displays the second display list 212 and hides the first display list 211 in response to the first switching operation, as shown in FIG. 5.

In the case that the second display list is in the display state, a second switching operation inputted by a user is received. The first display list is displayed and the second display list is hidden in response to the second switching operation.

Figure 5:
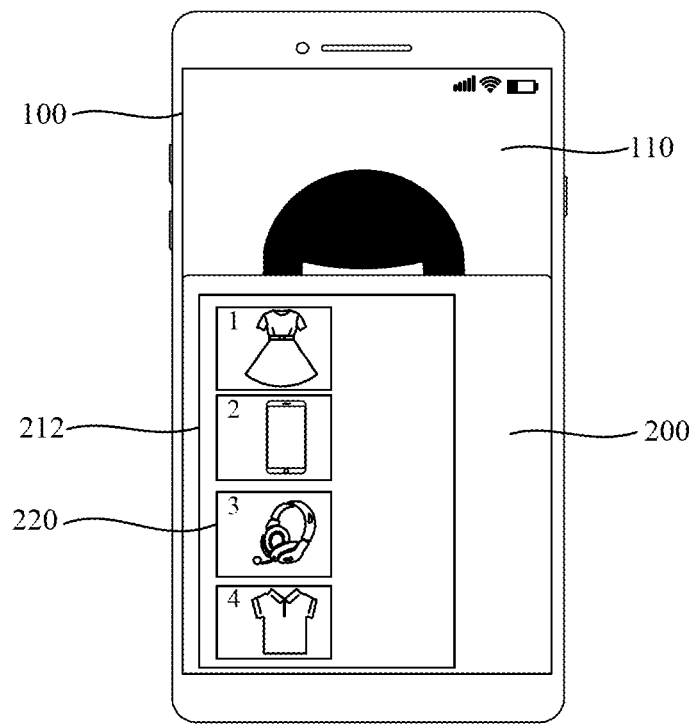
FIG. 5 is a schematic view of yet another object display interface according to an embodiment of the present disclosure.

As shown in FIG. 5, the second display list 212 in the object display interface 200 is in the display state. When the user wants to view the first display list, the user inputs a second switching operation. The electronic device receives the second switching operation inputted by the user, displays the first display list 211 and hides the second display list 212 in response to the second switching operation, as shown in FIG. 4.

The ways for inputting the switching operation by the user may include, but be not limited to, the following possible implementation.

In one implementation, the display states of the first display list and the second display list are switched by inputting a sliding operation on the object display interface.

Figure 6:
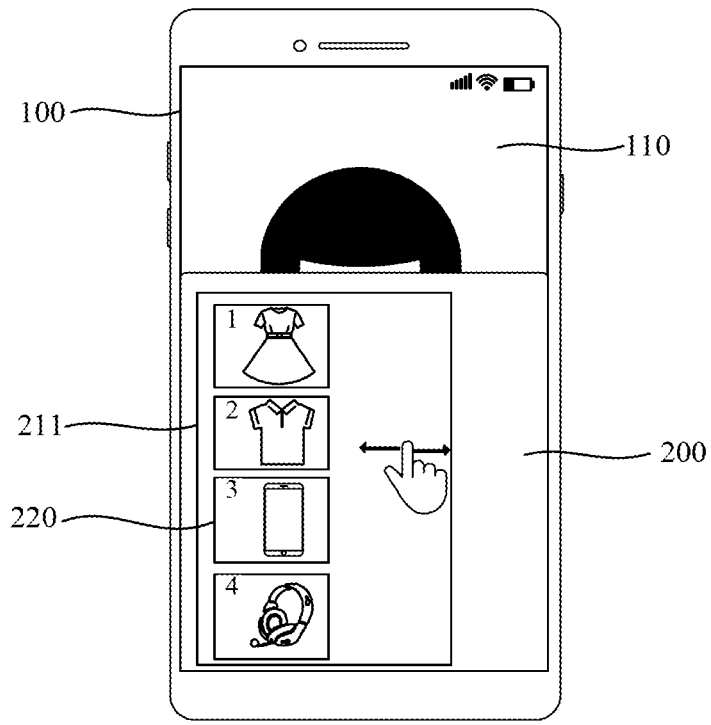
FIG. 6 is a schematic view of yet another object display interface according to an embodiment of the present disclosure.
Figure 7:
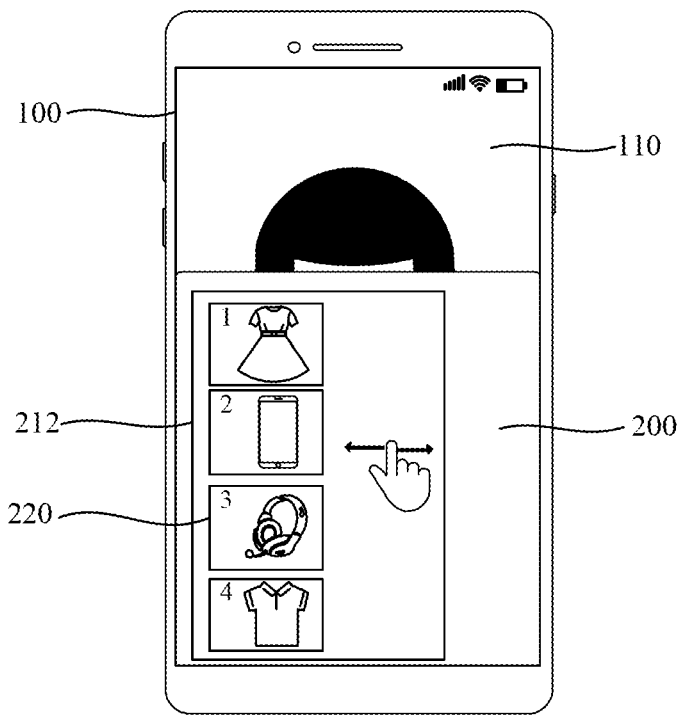
FIG. 7 is a schematic view of yet another object display interface according to an embodiment of the present disclosure.

The first switching operation and the second switching operation may be the same, which may be sliding left or sliding right. Areas on which the sliding-left operation or the sliding-right operation are performed may be a preset area. The method for setting the preset area is determined according to the actual form of list display, which is not limited in the present disclosure. For example, the first display list 211 in the current object display interface 200 is in the display state. As shown in FIG. 6, the user inputs a sliding-left operation on the object display interface 200. Then, the second display list 212 is displayed on the object display interface 200 and the first display list 211 is hidden, as shown in FIG. 7. The user inputs the sliding-left operation again on the interface shown in FIG. 7. Then, the first display list 211 is displayed on the object display interface 200 and the second display list 212 is hidden, as shown in FIG. 6.

The first switching operation and the second switching operation may be different. For example, the first switching operation is a sliding-left operation and the second switching operation is a sliding-right operation. For example, the first display list 211 in the current object display interface 200 is in the display state. As shown in FIG. 6, the user inputs the sliding-left operation on the object display interface 200. The second display list 212 is displayed on the object display interface and the first display list 211 is hidden, as shown in FIG. 7. The user inputs the sliding-right operation on the interface shown in FIG. 7. The first display list 211 is displayed on the object display interface 200 and the second display list 212 is hidden, as shown in FIG. 6.

In this implementation, the display states of the first display list and the second display list are switched by the sliding operation, such that the object display interface and the switching operation is relatively simple.

In an embodiment, when the user enters the object display interface for the first time, operation prompt information may be displayed, which is used to prompt the user to perform a switch between the first display list and the second display list through the sliding operation. The operation prompt information may include graphics and characters. The graphics and characters may be displayed in the form of animation, so as to facilitate the user to know the operation mode of switching operation. When the user enters the object display interface again, the operation prompt information is no longer displayed.

Figure 8:
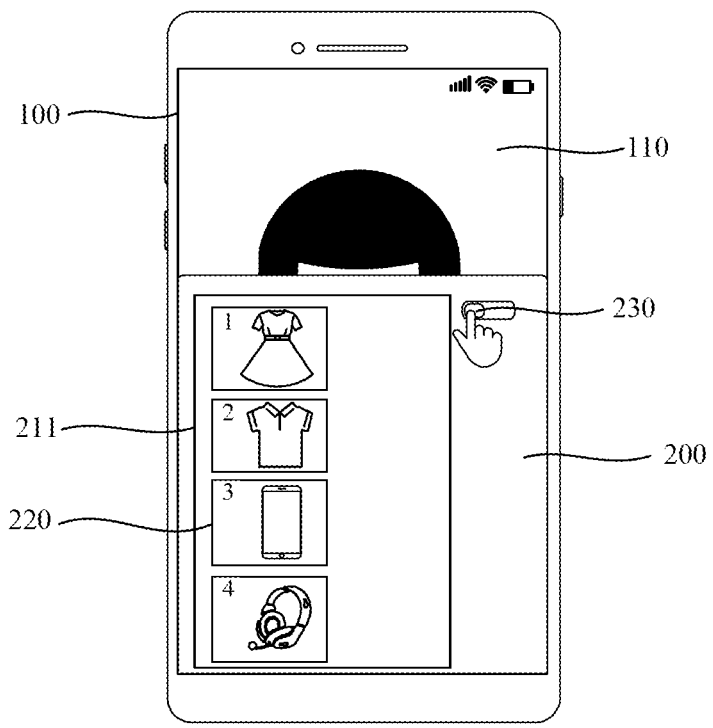
FIG. 8 is a schematic view of yet another object display interface according to an embodiment of the present disclosure.

In another implementation, a switching control 230 is displayed on the object display interface. As shown in FIG. 8, the display states of the first display list 211 and the second display list 212 may be switched by operating the switching control 230.

In yet another implementation, a first label and a second label are displayed on the object display interface. The first label corresponds to the first display list and the second label corresponds to the second display list.

Figure 9:
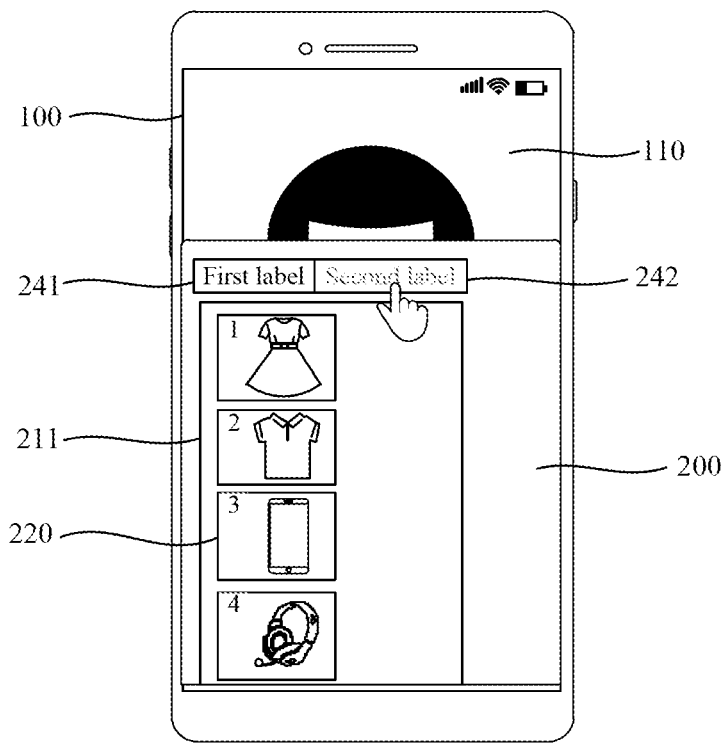
FIG. 9 is a schematic view of yet another object display interface according to an embodiment of the present disclosure.

As shown in FIG. 9, a first label 241 and a second label 242 are displayed on the object display interface 200. The first label and the second label may be displayed with names that are convenient for users to understand. For example, the first label is named "Default" and the second label is named "Recommended".

In an embodiment, the first switching operation includes clicking the second label, and correspondingly, the second switching operation includes clicking the first label.

Figure 10:
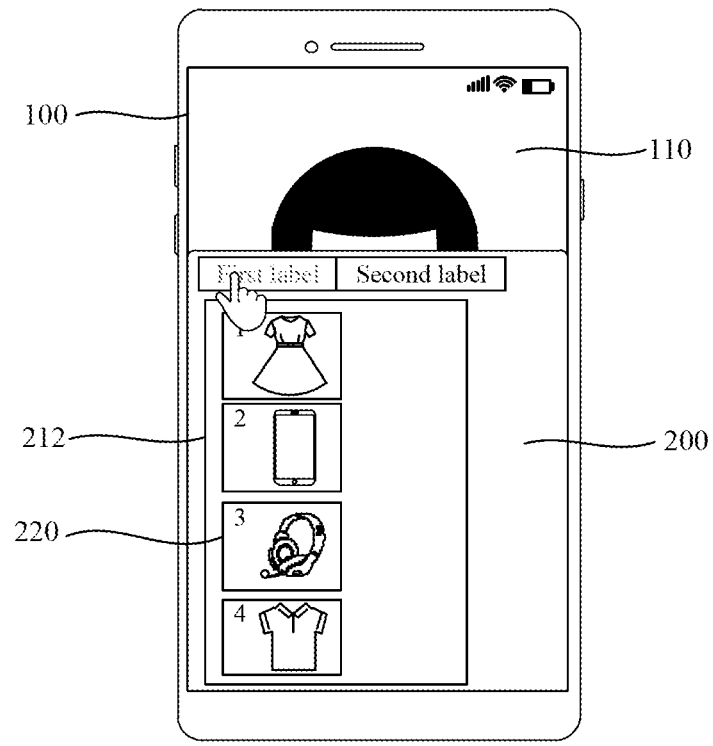
FIG. 10 is a schematic view of yet another object display interface according to an embodiment of the present disclosure.

As shown in FIG. 9, in the case that the first display list 211 is in the display state, the click operation performed by the user on the second label 242 is received. The second display list 212 is displayed and the first display list 211 is hidden, in response to the click operation on the second label 242, as shown in FIG. 10. Alternatively, as shown in FIG. 10, in the case that the second display list 212 is in the display state, a click operation performed by the user on the first label 241 is received. The first display list 211 is displayed and the second display list 212 is hidden in response to the click operation on the first label 241, as shown in FIG. 9.

In an embodiment, the first switching operation is a sliding operation from the first label to the second label. Correspondingly, the second switching operation is a sliding operation from the second label to the first label.

Figure 11:
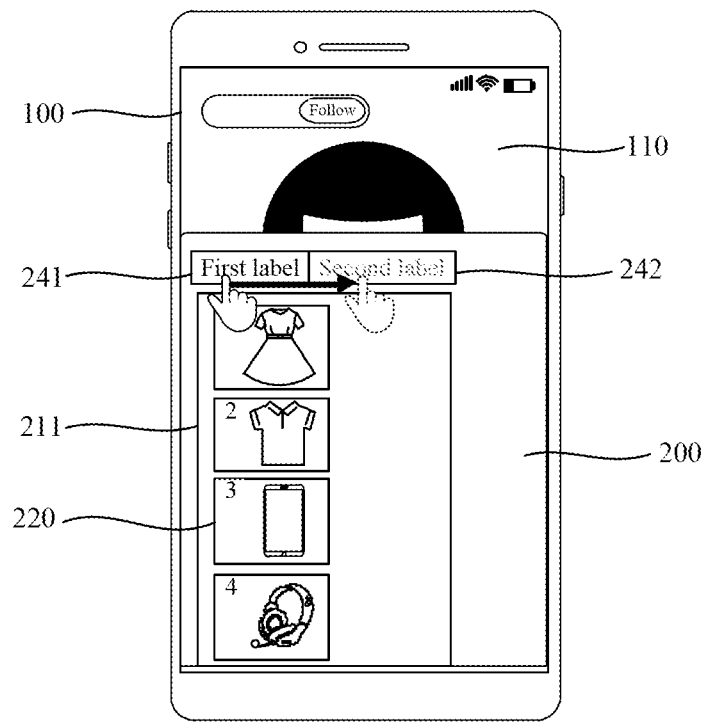
FIG. 11 is a schematic view of yet another object display interface according to an embodiment of the present disclosure.
Figure 12:
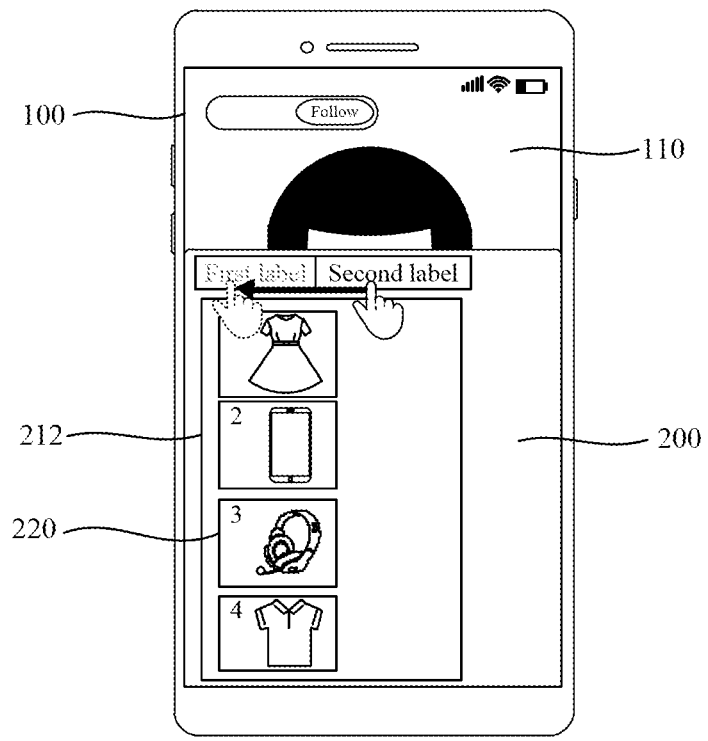
FIG. 12 is a schematic view of yet another object display interface according to an embodiment of the present disclosure.

As shown in FIG. 11, in the case that the first display list 211 is in the display state, the sliding operation from the first label to the second label is received. The second display list 212 is displayed and the first display list 211 is hidden in response to the sliding operation from the first label to the second label, as shown in FIG. 12. Alternatively, as shown in FIG. 12, in the case that the second display list 212 is in the display state, the sliding operation from the second label to the first label inputted by the user is received. The first display list 211 is displayed and the second display list 212 is hidden in response to the sliding operation from the second label to the first label, as shown in FIG. 11.

By displaying the first label and the second label, the user may intuitively understand display content of each display list. The first display list and the second display list may be switched through the first label and the second label by the convenient operation.

Figure 13:
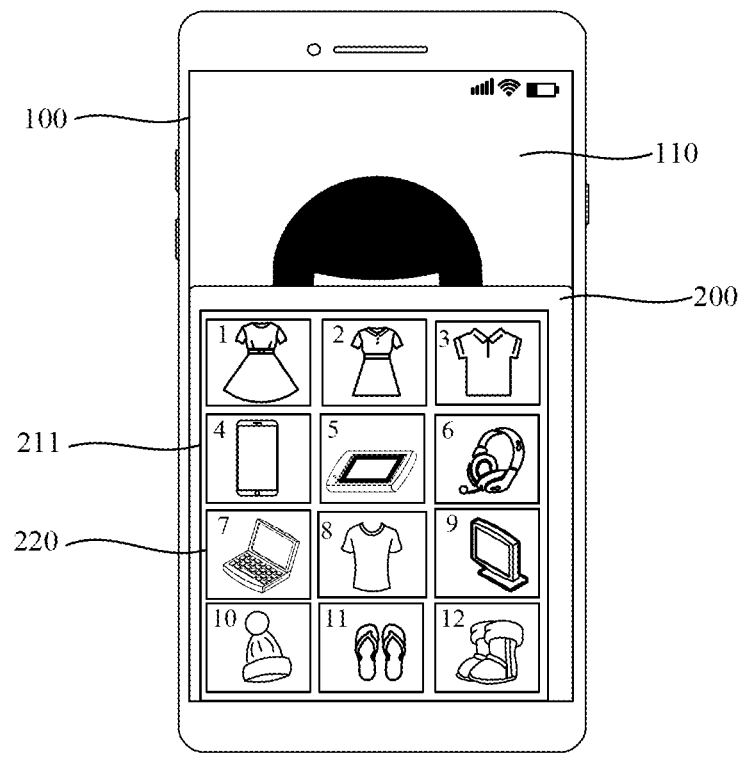
FIG. 13 is a schematic view of yet another object display interface according to an embodiment of the present disclosure.
Figure 14:
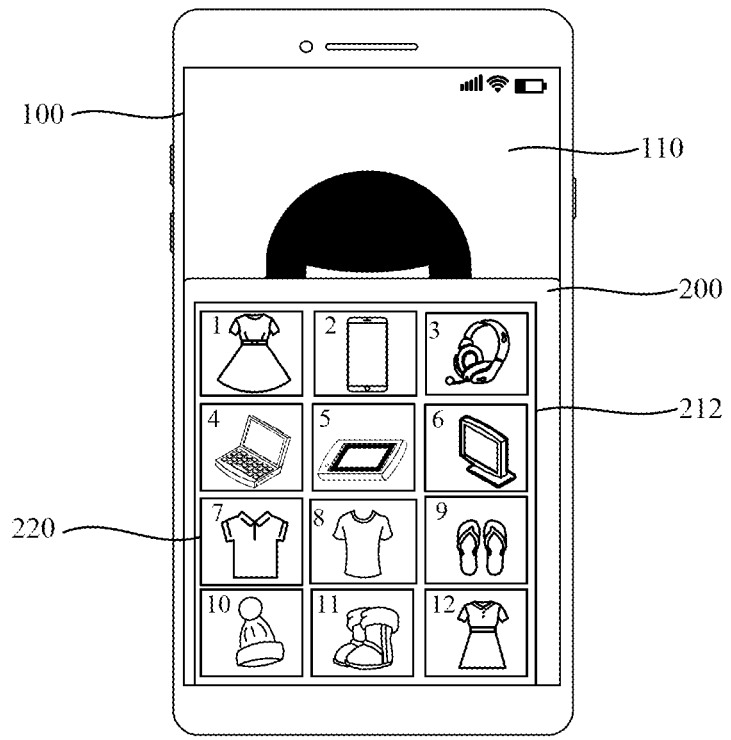
FIG. 14 is a schematic view of yet another object display interface according to an embodiment of the present disclosure.

In an embodiment, each of the first display list and the second display list is illustrated in a single column. In a scenario where only one display list is displayed at a time instant, the first display list or the second display list may be displayed in the form of multiple columns, as shown in FIGS. 13 and 14. The first display list is in the display state in FIG. 13, and the second display list is in the display state in FIG. 14. Due to the limited screen size of the electronic device, more objects may be displayed on the screen in a multi-column manner at the same time, to reduce the number of sliding operations of the user, and improve the efficiency of the user searching for a target object, thereby improving the user experience.

Figure 15:
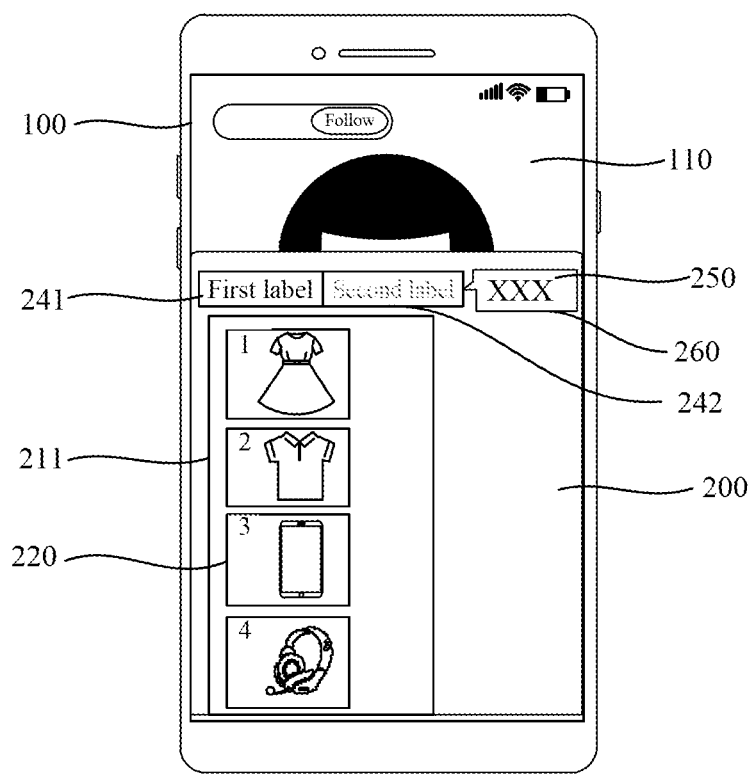
FIG. 15 is a schematic view of yet another object display interface according to an embodiment of the present disclosure.

In an embodiment, text description information 250 corresponding to the second label 242 is displayed on the object display interface 200. As shown in FIG. 15, the text description information 250 is used to illustrate that the objects 220 in the second display list 212 corresponding to the second label 242 are arranged based on the correlation information between the objects and the client.

Specifically, the second display list 212 corresponding to the second label 1242 is illustrated through the text description information 250, to prompt the user that the arrangement order of the objects in the second display list 212 is related to the correlation information between the object and the client, and further prompt the user of a selective display of the second display list 212. Thus, the related objects can be quickly obtained, thereby improving the browsing efficiency of the user, and thus improving the user experience.

It should be noted that the specific text content in the text description information is not limited according to an embodiment of the present disclosure.

In an embodiment, referring to FIG. 15, the text description information 250 corresponding to the second label 242 is displayed in a bubble box 260, which is displayed adjacent to the second label 242.

Exemplarily, as shown in FIG. 15, the bubble box 260 is rectangular and located on a side of the second label 242 far away from the second label 241. The text description information 250 is displayed in the bubble box 260. The side of the second label 242 far away from the second label 241 has a large space, which may set the bubble box 260 and does not affect the display content.

Figure 16:
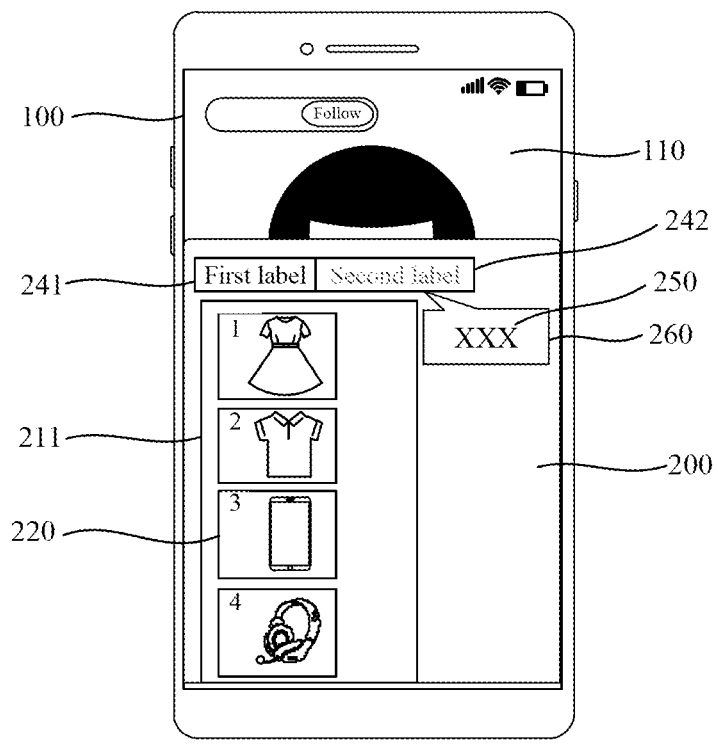
FIG. 16 is a schematic view of yet another object display interface according to an embodiment of the present disclosure.

It should be noted that FIG. 15 only exemplarily shows that the bubble box 260 is located on the side of the second label 242 far away from the second label 241. In other embodiments, the bubble box 260 may be located on the side of the second label 242 close to the second display list 212, as shown in FIG. 16. Alternatively, the bubble box may be located at other areas adjacent to the second label 242. The specific location of the bubble box 260 is not specifically limited according to the embodiment of the present disclosure.

It should also be noted that FIG. 15 exemplarily shows that the bubble box is rectangular. In other embodiments, the bubble box may be circular or oval. Alternatively, the bubble box may be in other shapes, which is not specifically limited in the present disclosure.

In an embodiment, the bubble box is hidden after being displayed for a preset time.

Specifically, after the user obtains the text description information in the bubble box, the bubble box is hidden, to avoid blocking other display contents for a long time. Thus, the integrity of the display screen is improved, thereby improving the user experience. The display time of the bubble box may be determined based on the time required for the user to read the text description information in the bubble box and the time required for the user to understand the text description information. For example, the display time of the bubble box may be set to 3 seconds. In other embodiments, the bubble box may be hidden after the user switches to the second display list.

In the above embodiments, optionally, the object display interface is displayed on the live streaming interface in a half-screen, or the object display interface may be displayed on the live streaming interface in a full-screen in an overlapping manner. In the above examples, the half-screen overlapping on the live streaming interface is taken as an example. The object display interface may be switched back to the live streaming display interface by the user clicking the live streaming interface. The object display interface covers a part of live streaming interface, where the part of live streaming interface may be the lower half, the upper half, the middle part, the left part or the right part, etc. The above embodiments are illustrated by taking the lower half of the live streaming interface being covered as an example. While the user browses the object display interface, the live streaming screen in the live streaming interface continues to play, which does not affect the user to get correlation information in the live streaming, thereby improving the user experience. In addition, part of the live streaming interface may be displayed when the display object display interface is displayed. Thus, the user may quickly exit the object display interface by clicking the live streaming interface and switch to the complete live streaming interface, which is convenient for the user to operate.

Figure 17:
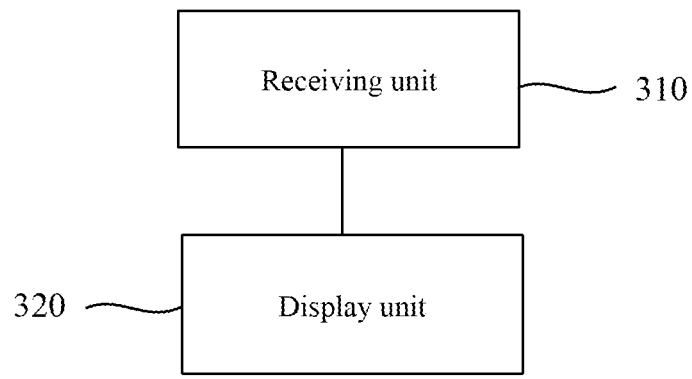
FIG. 17 is a schematic structural diagram of an object display apparatus according to an embodiment of the present disclosure.

An object display apparatus is provided according to an embodiment of the present disclosure. FIG. 17 is a schematic structural diagram of an object display apparatus according to an embodiment of the present disclosure. As shown in FIG. 17, the object display device includes a receiving unit 310 and a display unit 320.

The receiving unit 310 is configured to receive a trigger operation on a target control displayed on a live streaming interface.

The display unit 320 is configured to display an object display interface in response to the trigger operation.

The object display interface includes a first display list and a second display list, where the first display list includes at least one object, the second display list includes at least part of object in the first display list; the object in the second display list is arranged based on correlation information between the object in the second display list and the client; and one of the first display list and the second display list is in a display state.

The apparatus of this embodiment corresponds to the technical solution that may be used to implement the above method embodiments. The implementation principles of the apparatus and method are similar, which will not be repeated herein.

In the technical scheme provided according to the embodiment of the present disclosure, a receiving unit receives a trigger operation on a target control displayed on a live streaming interface; and the display unit displays an object display interface in response to the trigger operation, where the object display interface includes a first display list and a second display list, the first display list includes at least one object, the second display list includes at least part of object in the first display list, the object in the second display list is arranged based on correlation information between the object in the second display list and the client, and one of the first display list and the second display list is in a display state. Since the object in the second display list is arranged based on the correlation information between the object in the second display list and the client, the user can improve the efficiency of obtaining the target object, thereby improving the user experience.

In an embodiment, the display unit 320 is further configured to display the second display list and hide the first display list in response to a received first switching operation, in a case that the first display list is in the display state.

Alternatively, the display unit 320 is further configured to display the first display list and hide the second display list in response to a received second switching operation, in a case that the second display list is in the display state.

In an embodiment, a first label and a second label are displayed on the object display interface, where the first label corresponds to the first display list and the second label corresponds to the second display list.

The first switching operation includes: clicking the second label; or a sliding operation in a direction from the first label to the second label. The second switching operation includes: clicking the first label; or a sliding operation in a direction from the second label to the first label.

In an embodiment, text description information corresponding to the second label is displayed on the object display interface, and the text description information is used to illustrate that the object in the second display list corresponding to the second label is arranged based on the correlation information between the object in the second display list and the client.

In an embodiment, the text description information corresponding to the second label is displayed in a bubble box, and the bubble box is displayed adjacent to the second label.

In an embodiment, the bubble box is hidden after being displayed for a preset time.

In an embodiment, the object in the first display list include: an object related to the live streaming; and the second display list further includes an object unrelated to the live streaming.

In an embodiment, the object display interface is displayed on the live streaming interface in a half-screen in an overlapping manner.

Figure 18:
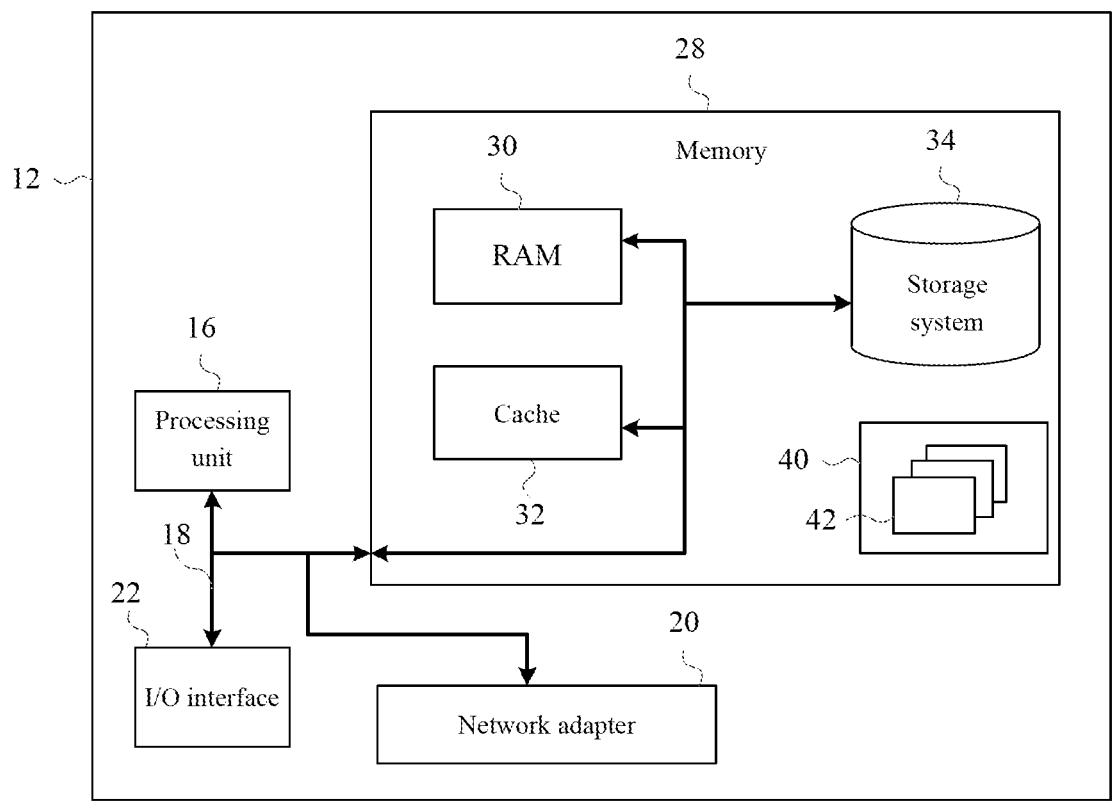
FIG. 18 is a schematic structural diagram of an electronic device according to an embodiment of the present disclosure.

FIG. 18 is a schematic structural diagram of an electronic device according to an embodiment of the present disclosure. FIG. 18 shows a block diagram of an exemplary electronic device that is suitable for implementing an embodiment of the present disclosure. The electronic device shown in FIG. 18 is only an example, which should not indicate any limitation to the function and application scope of the embodiments of the present disclosure.

As shown in FIG. 18, the electronic device 12 is represented in the form of a general-purpose computing device. Components of the electronic device 12 may include, but be not limited to, one or more processors 16, a system memory 28, and a bus 18 connecting respective system components (including the system memory 28 and the processor 16).

The bus 18 represents one or more of several types of bus structures, which includes a memory bus or a memory controller, a peripheral bus, a graphics acceleration port, a processor, or a local bus using any of multiple bus structures. For example, these bus structures include, but are not limited to: an industry standard architecture (ISA) bus, a micro channel architecture (MAC) bus, an enhanced ISA bus, a video electronics standards association (VESA) local bus, and a peripheral component interconnect (PCI) bus.

The electronic device 12 typically includes a variety of computer system readable media. The media may be any media that can be accessed by the electronic device 12, which includes volatile and nonvolatile media, removable and non-removable media.

The system memory 28 may include computer system-readable media in a form of volatile memory, such as a random access memory (RAM) 30 and/or a cache memory 32. The electronic device 12 may further include other removable/non-removable, volatile/non-volatile computer system storage media. For example only, a storage system 34 may be configured to read and write non-removable, non-volatile magnetic media (which is not shown in FIG. 18 and is commonly referred to as a "hard drive"). Although not shown in FIG. 18, a disk drive for reading and writing of a removable non-volatile disk (such as a floppy disk) and an optical disc drive for reading and writing of a removable non-volatile optical disc (such as a CD-ROM, DVD-ROM, or other optical media) may be provided. In these cases, each driver may be connected to the bus 18 by one or more data medium interfaces. The system memory 28 may include at least one program product having a set of (for example, at least one) program modules configured to perform the functions of various embodiments of the present disclosure.

A program/utility tool 40 having the at least one program module 42 may be stored in, for example, the system memory 28. The program module 42 includes, but is not limited to: an operating system, one or more application programs, other program modules, and program data. Each or a combination of the examples may include an implementation of a network environment. The program module 42 is generally configured to perform functions and/or methods according to the embodiments of the present disclosure.

The processor 16 runs at least one of multiple programs stored in the system memory 28, to execute various functional applications and data processing, for example, implementing the object display method provided according to the embodiment of the present disclosure.

A computer-readable storage medium is further provided according to an embodiment of the present disclosure. The computer-readable storage medium stores a computer program. The computer program, when executed by a processor, implements any object display method provided according to the embodiment of the present disclosure. That is, the computer program, when executed by a processor, implements the following steps of: receiving a trigger operation on a target control displayed on a live streaming interface; and displaying an object display interface in response to the trigger operation, where the object display interface comprises a first display list and a second display list, the first display list includes at least one object, the second display list includes at least part of object in the first display list; the object in the second display list is arranged based on correlation information between the object in the second display list and a client, and one of the first display list and the second display list is in a display state.

Any combination of the one or more computer readable mediums may be used. The computer readable medium may be a computer readable signal medium or a computer readable storage medium. The computer readable storage medium may be, but is not limited to, a system, an apparatus, or a device in an electronic, magnetic, optical, electromagnetic, infrared, or semi-conductive form, or any combination thereof. More specific examples (a non-exhaustive list) of the computer readable storage medium may include an electrical connection with one or more wires, a portable computer disk, a hard disk, a random access memory (RAM), a read only memory (ROM), an erasable programmable read only memory (EPROM or a flash memory), an optical fiber, a portable compact disk read only memory (CD-ROM), an optical storage device, a magnetic storage device, or any suitable combination of the above. In the present disclosure, the computer readable storage medium may be any tangible medium containing or storing a program, and the program may be used by or in combination with an instruction execution system, apparatus, or device.

The computer readable signal medium may include a data signal transmitted in a baseband or transmitted as a part of a carrier, and the data signal carries computer readable program codes. The propagated data signal may include but not limited to an electromagnetic signal, an optical signal or any combination thereof. A computer-readable signal medium can also be any computer-readable medium other than a computer-readable storage medium that can transmit, propagate, or transport the program for use by or in connection with the instruction execution system, apparatus or device.

Program code stored on a computer readable medium may be transmitted using any suitable medium including, but not limited to, an electrical wire, an optical fiber cable, RF (radio frequency), or any suitable combination thereof.

Computer program codes for performing operations of the present disclosure may be written by using one or more program design language or any combination. The program design language includes but not limited to object oriented program design language such as Java, Smalltalk and C++, and further includes conventional process-type program design language such as "C" or similar program design language. The program code may be executed entirely on a user computer, or be executed partly on the user computer, or be executed as a stand-alone software package, or be executed partly on the user computer and partly on a remote computer, or be executed entirely on the remote computer or server. In case of a remote computer, the remote computer may be connected to the user computer through any kind of network, including a local area network (LAN) or a wide area network (WAN). Alternatively, the remote computer may be connected to an external computer (for example, over the Internet provided by an Internet service provider).

A computer program product is also provided according to an embodiment of the present disclosure. The computer program product, when run on a computer, causes the computer to execute the object display method provided according to the embodiment of the present disclosure.

It should be noted that the relationship terms "first", "second" and the like herein are used for distinguishing an entity or operation from another entity or operation, but not intended to necessitate or imply an actual relationship or order between these entities or operations. Furthermore, terms "include", "comprise" or any other variants are intended to cover the non-exclusive inclusion. Therefore, a process, method, article or device including a series of elements is not necessarily limited to those expressly listed steps or units, but may include other elements not expressly listed or inherent to the process, method, article, or device. Moreover, the expression "comprising a(n) . . . " in which an element is defined will not preclude presence of an additional identical element(s) in a process, method, article or device comprising the defined element(s)" unless further defined.

The above are only specific implementations of the present disclosure, such that those skilled in the art can understand or implement the present disclosure. It is obvious for those skilled in the art to make many modifications to these embodiments. The general principle defined herein may be applied to other embodiments without departing from the spirit and the scope of the present disclosure. Therefore, the present disclosure would not be limited to the embodiments described in this specification, but shall conform to the widest scope consistent with the principles and novel features disclosed herein.

The invention claimed is:

1. An object display method, applied to a client, wherein the method comprises:
  receiving a trigger operation on a target control displayed on a live streaming interface; and
  displaying an object display interface in response to the trigger operation, wherein the object display interface comprises a first display list and a second display list, the first display list comprises at least one object, the second display list comprises at least part of the at least one object in the first display list; the object in the second display list is arranged based on correlation information between the object in the second display list and the client, and at least one of the first display list and the second display list is in a display state,
  wherein the method further comprises:
  when the first display list is in the display state, displaying the second display list and hiding the first display list in response to a received first switching operation; or
  when the second display list is in the display state, displaying the first display list and hiding the second display list in response to a received second switching operation,
  wherein a first element and a second element are displayed on the object display interface, wherein the first element corresponds to the first display list and the second element corresponds to the second display list;
  the first switching operation comprises: clicking the second element; or a sliding operation in a direction from the first element to the second element; and
  the second switching operation comprises: clicking the first element; or a sliding operation in a direction from the second element to the first element.

2. The method according to claim 1, wherein text description information corresponding to the second element is displayed on the object display interface, and the text description information is used to illustrate that the object in the second display list corresponding to the second element is arranged based on the correlation information between the object in the second display list and the client.

3. The method according to claim 2, wherein the text description information corresponding to the second element is displayed in a bubble box, and the bubble box is displayed adjacent to the second element.

4. The method according to claim 3, wherein the bubble box is hidden after being displayed for a preset time.

5. The method according to claim 1, wherein the object display interface further comprises a switching control, and the received first switching operation and the received second switching operation comprise a trigger operation on the switching control.

6. The method according to claim 1, wherein the at least one object in the first display list comprises: an object related to live streaming; and
  the second display list further comprises an object unrelated to the live streaming.

7. The method according to claim 1, wherein the object display interface is displayed on the live streaming interface in a half-screen in an overlapping manner.

8. An electronic device, comprising:
  a processor configured to execute a computer program stored in a memory,
  wherein the computer program, when executed by the processor, causes the processor to:
  receive a trigger operation on a target control displayed on a live streaming interface; and
  display an object display interface in response to the trigger operation, wherein the object display interface comprises a first display list and a second display list, the first display list comprises at least one object, the second display list comprises at least part of the at least one object in the first display list; the object in the second display list is arranged based on correlation information between the object in the second display list and a client, and at least one of the first display list and the second display list is in a display state,
  wherein the computer program, when executed by the processor, causes the processor to:
  when the first display list is in the display state, display the second display list and hide the first display list in response to a received first switching operation; or
  when the second display list is in the display state, display the first display list and hide the second display list in response to a received second switching operation,
  wherein a first element and a second element are displayed on the object display interface, wherein the first element corresponds to the first display list and the second element corresponds to the second display list;

the first switching operation comprises: clicking the second element; or a sliding operation in a direction from the first element to the second element, and the second switching operation comprises: clicking the first element; or a sliding operation in a direction from the second element to the first element.

9. The electronic device according to claim 8, wherein text description information corresponding to a second element is displayed on the object display interface, and the text description information is used to illustrate that the at least part of the at least one object in the second display list corresponding to the second element is arranged based on the correlation information between the object in the second display list and the client.

10. The electronic device according to claim 9, wherein the text description information corresponding to the second element is displayed in a bubble box, and the bubble box is displayed adjacent to the second element.

11. The electronic device according to claim 10, wherein the bubble box is hidden after being displayed for a preset time.

12. The electronic device according to claim 8, wherein the object display interface further comprises a switching control, and the received first switching operation and the received second switching operation comprise a trigger operation on the switching control.

13. The electronic device according to claim 8, wherein the at least one object in the first display list comprises: an object related to live streaming; and the second display list further comprises an object unrelated to the live streaming.

14. The electronic device according to claim 8, wherein the object display interface is displayed on the live streaming interface in a half-screen in an overlapping manner.

15. A non-transitory computer readable storage medium storing a computer program, wherein the computer program, when executed by a processor, causes the processor to:

receive a trigger operation on a target control displayed on a live streaming interface; and display an object display interface in response to the trigger operation, wherein the object display interface comprises a first display list and a second display list, the first display list comprises at least one object, the second display list comprises at least part of the at least one object in the first display list; the object in the second display list is arranged based on correlation information between the object in the second display list and a client, and at least one of the first display list and the second display list is in a display state, wherein the computer program, when executed by the processor, causes the processor to:

when the first display list is in the display state, display the second display list and hide the first display list in response to a received first switching operation; or when the second display list is in the display state, display the first display list and hide the second display list in response to a received second switching operation, wherein a first element and a second element are displayed on the object display interface, wherein the first element corresponds to the first display list and the second element corresponds to the second display list;

the first switching operation comprises: clicking the second element; or a sliding operation in a direction from the first element to the second element; and the second switching operation comprises: clicking the first element; or a sliding operation in a direction from the second element to the first element.

\* \* \* \* \*